July 7, 1942.                A. RINNELA                 2,289,212
SHOEMAKER'S RACK
Filed April 21, 1941

INVENTOR
*Andrew Rinnela*
BY
*Zoltan Holocsik*
ATTORNEY

Patented July 7, 1942

2,289,212

UNITED STATES PATENT OFFICE 2,289,212

SHOEMAKER'S RACK

Andrew Rinnela, New York, N. Y.

Application April 21, 1941, Serial No. 389,549

5 Claims. (Cl. 211—133)

This invention relates to new and useful improvements in a shoemaker's rack.

More specifically, the invention proposes the construction of a shoemaker's rack characterized by a vertical stand having a plurality of trays mounted thereon one above the other, and each of said trays being sub-divided into a plurality of compartments for holding tacks, nails, and other similar objects common to the trade.

Still further it is proposed to provide a plurality of clamps adjustably mounted on said stand in a manner to hold said trays in various spaced positions from each other along said vertical stand.

Still further it is proposed to form each of said trays with a downwardly extending flange which is adapted to engage into a complementary recess formed in said clamps for rotatively supporting said trays thereon.

Still further it is proposed to provide a manually controllable means within said vertical stand and cooperative with said trays in a manner to hold the same against rotating when desired.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Figure 1:
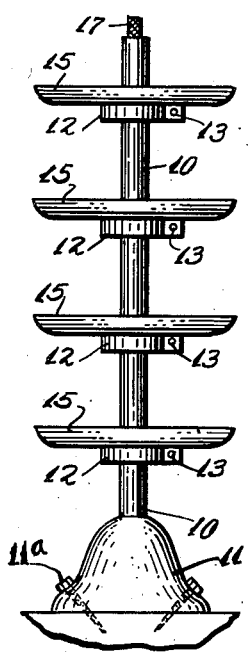
Fig. 1 is an elevational view of the shoemaker's rack constructed in accordance with this invention.
Figure 2:
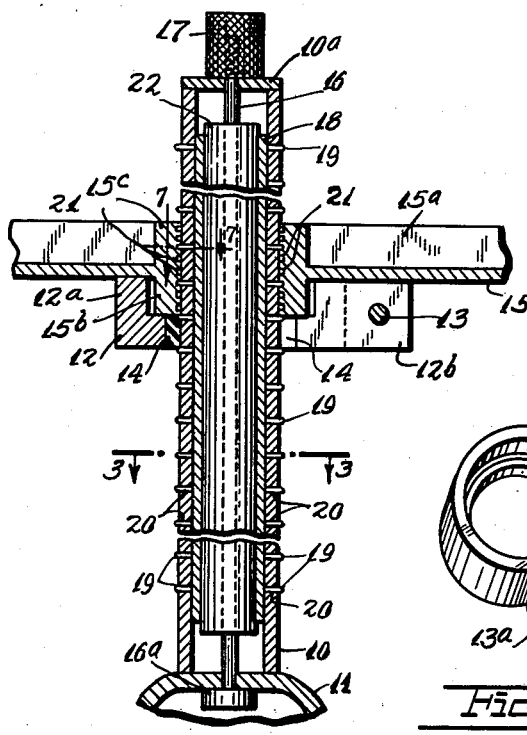
Fig. 2 is a vertical sectional view of a portion of Fig. 1.
Figure 6:
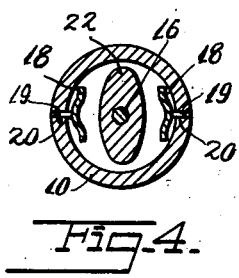
Fig. 6 is a perspective view of one of the clamps per se.

The shoemaker's rack, according to this invention, includes a vertical stand 10 of tubular metallic form which is provided at its bottom with a base 11 for maintaining the stand in an upright position, by the aid of bolts 11a.

A plurality of clamps 12 are adjustably mounted at spaced positions along the length of the stand 10. Each of the clamps 12 comprises a circular portion 12a for engaging around the stand 10 and which is open at one of its sides. Outwardly extended flanges 12b extend from the open side of the circular portion 12a. A screw 13 is passed through the flanges 12b and is provided with a thumb nut 13a for drawing the flanges 12b together to rigidly position the clamp upon the stand 10. The center of the clamp 12a is provided with an enlarged opening 12c and the material of the clamp below the enlarged opening 12c is formed with a rubber portion 14 which is adapted to bear against and frictionally hold the clamp in position when the thumb nut 13a is tightened to draw the flanges 12b together.

A tray 15 is provided for each clamp 12 and is adapted to hold tacks, nails and other small objects common to the trade. Each of the trays is provided with a plurality of partitions 15a dividing the interior of the tray into a plurality of separate compartments into which the objects may be placed. Each of the trays 15 is provided on its bottom face with a downwardly extending flange 15b which is adapted to engage the enlarged opening 12c formed in each of the clamps 12 for rotatively supporting the trays in various fixed positions one above the other upon the vertical stand 10.

A means is provided for releasably holding the trays against rotating when so desired. To accomplish this the top end of the vertical stand 10 is closed by means of a wall 10a. A rod 16 is coaxially extended through the vertical stand 10 and the wall 10a and the base 11 act as bearings for this rod. The bottom end of the rod 16 is formed with an enlarged head 16a which is in face contact with the base 11. The upper end of the rod 16 has a knurled knob 17 threadedly engaged thereon which is adapted to be manually grasped and rotated for similarly turning the rod 16.

Within the vertical stand 10 there is a pair of vertically extended members 18 adjacent diametrically opposite faces of the stand 10. Each of these vertically extended members 18 is provided on its outer face with a plurality of pins 19 which are adapted to extend through aligned openings 20 formed along the length of the stand 10. When the vertically extended members are in face contact with the side walls of the stand 10 and the pins 19 extend slightly beyond the outer face of the vertical stand and engage into complementary recesses 21 formed in the hub 15c of each of the trays 15. When these pins engage into the recesses 21 they act to hold the trays against being rotated. A means is provided for urging the vertically extended members into face contact with the vertical stand 10 and comprises an elongated cam 22 mounted coaxially upon the rod 16 and in one turned position of the rod 16 the cam 22 acts to urge the vertically extended members 18 into face contact with the vertical stand 10. This position is shown in Fig. 3.

Figures 3, 4, 5:
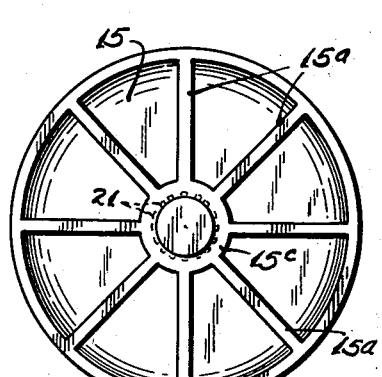
Fig. 3 is a horizontal sectional view taken on the line 3—3 of Fig. 2.
Fig. 4 is a view similar to Fig. 3 but illustrating an adjusted position of the parts.
Fig. 5 is a plan view of one of the trays per se.
Figure 7:
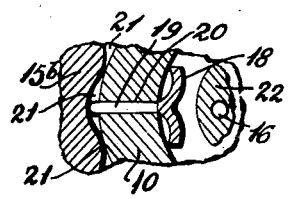
Fig. 7 is an enlarged horizontal sectional view taken on the line 7—7 of Fig. 2.

However, if the knob 17 is turned through 90° to the position shown in Fig. 4, the cam 22 will be out of contact with relation to the vertically extended members 18 and the trays 15 will be free to be turned. The pins 19 only extend from the vertical stand in their completely extended position a very little distance and have rounded outer ends.

Similarly, the recesses 21 are round and when the cam 22 is in a position in which the vertically extended members are free the rotation of the tray will cause the pins to be urged inwards and free the tray. The pins 19 are of a length sufficiently great to maintain their position within the openings 20 when the cam is in its non-operative position as shown in Fig. 4 for preventing the same from being completely disengaged therefrom.

The operation of this device is as follows:

The clamps 12 are positioned at any desired place along the length of the vertical stand 10 and are maintained in their adjusted positions by tightening the thumb nut 13ª. The trays 15 are adapted to be normally extended over the stand 10 with their downwardly extending flanges 15ᵇ engaging the enlarged openings 12ᶜ formed in the clamps 12. In this position the trays 15 are free to be rotated to cause any desired compartment to be brought to the front thereof for permitting the objects contained therein to be conveniently removed. If it is desired to lock the trays 15 against rotating it is merely necessary to grasp the knob 17 and turn the same through substantially 90° to cause the cam 22 to move into an operative position and project the pins 19 to engage the recesses 21 in the hub 15ᶜ of the trays to maintain the same against rotating.

It is to be understood that in this rack, two or more trays 15 may be used, the size of the trays 15, and of base 11, may be changed as desired and these members may be made of metal, composition, or of any suitable substance.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A shoemaker's rack, comprising a vertical stand, a plurality of clamps adjustably mounted on said stand, a tray for each clamp and adapted to hold tacks and other small objects and formed with a central hub having a central opening through which said stand extends so that each of said trays may be rotatively supported on its clamp, and means mounted on said stand for releasably holding said trays non-rotatively, said means comprising diametrically opposite vertical extended members located within said vertical stand, a plurality of pins mounted on said vertical member and extendable through openings formed in said stand and engageable with complementary openings formed in the hubs of said trays, and a means for urging said vertical members into a position in which said pins will engage said openings.

2. A shoemaker's rack, comprising a vertical stand, a plurality of clamps adjustably mounted on said stand, a tray for each clamp and adapted to hold tacks and other small objects and formed with a central hub having a central opening through which said stand extends so that each of said trays may be rotatively supported on its clamp, and means mounted on said stand for releasably holding said trays non-rotatively, said means comprising diametrically opposite vertical extended members located within said vertical stand, a plurality of pins mounted on said vertical members and extendable through openings formed in said stand and engageable with complementary openings formed in the hubs of said trays, and a means for urging said vertical members into a position in which said pins will engage said openings, said latter-mentioned means comprising a rod coaxially rotatively extended through said vertical stand and a cam engageable against adjacent faces of said vertical members for holding them in a position in which said pins are extended, and in a turned position of said rod, said cam being disengageable from said vertical members so that said pins will be retracted when said tray is turned.

3. A shoemaker's rack, comprising a vertical stand, a plurality of clamps adjustably mounted on said stand, a tray for each clamp and adapted to hold tacks and other small objects and formed with a central hub having a central opening through which said stand extends so that each of said trays may be rotatively supported on its clamp, and means mounted on said stand for releasably holding said trays non-rotatively, said means comprising diametrically opposite vertical extended members located within said vertical stand, a plurality of pins mounted on said vertical members and extendable through openings formed in said stand and engageable with complementary openings formed in the hubs of said trays, and a means for urging said vertical members into a position in which said pins will engage said openings, said latter-mentioned means comprising a rod coaxially rotatively extended through said vertical stand and a cam engageable against adjacent faces of said vertical members for holding them in a position in which said pins will be extended, and in a turned position of said rod, said cam being disengageable from said vertical members so that said pins will be retracted when said tray is turned, said rod being turnable by means of a knob mounted upon one end thereof.

4. In a shoemaker's rack, a vertical tubular stand, trays rotatively supported at varying elevations upon said stand, members extended vertically along diametrically opposite inside faces of said vertical tubular stand, a plurality of spaced pins mounted on said members and normally having their ends extended into vertical lines of aligned openings formed in said vertical stand, and means for causing said pins to be extended beyond the outer faces of said vertical stand causing certain of said pins to engage complementary openings in said trays to hold said trays against being turned on said vertical stand.

5. In a shoemaker's rack, a vertical tubular stand, trays rotatively supported at varying elevations upon said stand, members extended vertically along diametrically opposite inside faces of said vertical tubular stand, a plurality of spaced pins mounted on said members and normally having their ends extended into vertical lines of aligned openings formed in said vertical stand, and means for causing said pins to be extended beyond the outer faces of said vertical stand causing certain of said pins to engage complementary openings in said trays to hold said trays against being turned on said vertical stand, said pins being formed with rounded outer ends and said openings in said trays being rounded to cooperate with the rounded ends of said pins to urge said pins inwards when said means is released and said trays are turned.

ANDREW RINNELA.